US005246094A

United States Patent [19]

Army et al.

[11] Patent Number: 5,246,094

[45] Date of Patent: Sep. 21, 1993

[54] PAWL AND RATCHET CLUTCH HAVING PAWL WITH SHIFTING CENTER OF GRAVITY

[75] Inventors: Donald E. Army, Springfield, Mass.; Gordon D. Tichiaz, Avon, Conn.

[73] Assignee: United Technologies Corporation, Hartford, Conn.

[21] Appl. No.: 846,118

[22] Filed: Mar. 5, 1992

[51] Int. Cl.[5] .................... F16D 41/12; F16D 43/14

[52] U.S. Cl. .................... 192/46; 192/42; 192/104 C

[58] Field of Search .................... 192/42, 46, 41 R, 63, 192/71, 103 B, 104 C, 105 CD; 74/576, 7 C; 60/39.142

[56] References Cited

U.S. PATENT DOCUMENTS

| | | | |
|---|---|---|---|
| 709,900 | 9/1902 | Gurney et al. | 192/46 |
| 1,219,698 | 3/1917 | Brackett | 192/42 |
| 1,753,825 | 4/1930 | Ford | 192/42 |
| 1,767,593 | 6/1930 | Laabs | 192/42 |
| 3,727,733 | 4/1973 | Mrazek | 192/42 |
| 4,116,314 | 9/1978 | Ackerman | 192/46 |
| 4,187,728 | 2/1980 | Mazzorana | 74/6 |
| 4,899,534 | 2/1990 | Sorenson | 60/39.06 |
| 4,914,906 | 4/1990 | Burch | 60/39.142 |
| 4,926,631 | 5/1990 | Sorenson | 60/39.142 |

*Primary Examiner*—Richard M. Lorence
*Attorney, Agent, or Firm*—William W. Habelt

[57] ABSTRACT

A pneumatic starter (10) incorporates a pawl and ratchet clutch assembly (50) having a ratchet member (46) mounted to a drive member (40) powered by an air expansion turbine (20), and a plurality of pawls (48) disposed circumferentially about the ratchet member (46) and operable in engagement therewith to transmit rotational drive torque from the drive member (40) to a driven member (60). Each of the pawls (48) is supported on a pivot pin (52) for pivotal movement into and out of engagement with the ratchet member (46) about its pivot axis (55). Preload springs (54) are provided for biasing the pawls (48) to pivot radially inwardly into engagement with the ratchet member (46). A weight ball (82) is disposed in a slot (80) extending along each pawl (48) so as to define a travel path between the toe end (47) and the heel end (48) thereof. As the ball (82) rolls along the travel path in response to the rotational speed of the driven member (60), the center of gravity (93) of the pawl shifts relative to its pivot axis (55).

2 Claims, 3 Drawing Sheets

PAWL AND RATCHET CLUTCH HAVING PAWL WITH SHIFTING CENTER OF GRAVITY

TECHNICAL FIELD

The present invention relates generally to pawl and ratchet clutches for use on unidirectional drive systems, and more particularly a pawl and ratchet clutch suitable for use in a starter for starting engines, such as aircraft turbine engines.

BACKGROUND ART

Pawl and ratchet clutches are often utilized in unidirectional drive systems for transmitting drive torque from a drive shaft to a driven shaft. For example, starters of the type commonly used to start engines, in particular the turbine engines of modern gas turbine powered aircraft, often employ a pawl and ratchet type clutch which functions to transmit rotational drive torque from a drive shaft of the starter to drive the engine being started to starting speed. One type of starter often employing a pawl and ratchet clutch is the pneumatic starter, also known as an air turbine starter, such as disclosed, for example, in U.S. Pat. Nos. 3,727,733; 4,899,534; 4,914,906; and 4,926,631.

A pawl and ratchet clutch of type commonly used in such pneumatic starters includes a toothed ratchet member mounted on a central drive shaft and a plurality of pivotal pawls supported from and rotating with a driven output shaft disposed coaxially about the drive shaft. The pawls are operatively disposed at circumferentially spaced intervals about the ratchet member in cooperative relationship therewith. Each pawl is biased to pivot radially inwardly by a leaf spring operatively associated therewith to engage a tooth of the ratchet member thereby coupling the drive shaft in driving relationship to the driven output shaft so long as the pawls remain engaged with the teeth of the ratchet member. The drive shaft is connected, either directly or through suitable reduction gearing as desired, to the shaft of the pneumatic starter turbine, which is powered by extracting energy from a flow of pressurized fluid passed through the turbine of the starter.

To start the turbine engine, the output end of the driven output shaft of the starter is connected, for example by mating splines, to an engine shaft operatively connected to the main engine shaft through a gear box, and pressurized fluid, typically compressed air, is passed through the turbine of the pneumatic starter. As the starter turbine extracts energy from the compressed air passing therethrough, the drive shaft of the starter turbine is rotated to in turn rotatably drive the output shaft of the starter, and consequently the turbine engine shaft connected thereto, through the engagement of the pawls pivotally mounted to the output shaft with the ratchet member mounted to the drive shaft. Typically, the starter is designed to accelerate the engine shaft from zero to a predetermined cut-off speed, typically of about 5000 revolutions per minute, in about one minute or less.

Once engine light-off has occurred and the engine shaft is rotating at the desired cut-off speed, the flow of pressurized air to the starter turbine is terminated. With the flow of pressurized air to the starter turbine shut-off, the drive shaft of the starter rapidly slows down. Consequently, the ratchet member mounted to the starter drive shaft also rapidly slows down, while the pawls supported from the starter output shaft continue to rotate with the shaft of the operating turbine engine at the relatively high cut-off speed. The pawls become disengaged from the ratchet member when the rotational speed of the output shaft exceeds a threshold speed whereat the pawls lift-off of the ratchet member, that is pivot radially outwardly out of contact with the teeth of the ratchet member, under the influence of the centrifugal forces acting thereon due to the continued rotation of the pawls at the relatively high speed of the engine shaft. The pawls remain disengaged from the ratchet member so long as the rotational speed of the engine shaft remains high enough that the centrifugal forces acting on the pawls exceed the opposing moment imposed on the pawls by the force of the bias springs.

When the turbine engine is later shut-down, the operating speed of the engine shaft of the turbine engine to which the output shaft of the starter is connected rapidly decreases as the turbine engine spools down. As the starter shaft slows down, the centrifugal force on the pawls consequently decreases and the force of each bias spring progressively pivots its associated pawl radially inwardly again toward the ratchet member until each pawl reengages a ratchet tooth on the non-rotating ratchet member so as to reengage the clutch. The speed at which the reengagement of the pawls with the ratchet member occurs, commonly referred to as the reengagement speed, is less than the pawl lift-off speed by an amount commonly referred to as the clutch hysteresis.

In prior art pawl and ratchet clutches, pawl reengagement often occurs at too high of a rotational speed, which results in the pawls undesirably ratcheting along the teeth of the non-rotating ratchet member before becoming engaged therewith. Such ratcheting causes undesirable wear of the pawls and teeth of the clutch, necessitating premature repair or replacement of the clutch assembly. Additionally, the repeated bouncing of the pawls during ratcheting can set up an undesirable vibration in the starter which can detrimentally impact bearings, gears and shaft members throughout the starter. It would be desirable, therefore, to delay reengagement of the pawls with the ratchet teeth until the rotational speed of the driven shaft has slowed to a lower speed at which the occurrence of such ratcheting is eliminated or at least substantially reduced, thereby reducing wear on and increasing the service life of the clutch assembly.

DISCLOSURE OF INVENTION

It is an object of the present invention to provide a pawl and ratchet clutch wherein the lift-off of the pawls from the ratchet teeth occurs at a relatively high rotational speed, while the reengagement of the pawls with the ratchet teeth during spool down is delayed until a relatively low rotational speed is reached at which the occurrence of pawl ratcheting is eliminated or at least substantially reduced, thereby reducing wear on and increasing the service life of the clutch assembly.

It is a further object of the present invention to provide a pawl and ratchet clutch wherein the center of gravity of each pawl shifts position in response to the rotational speed at which the pawl carrier is rotating so as to delay pawl lift-off to a higher rotational speed and to delay pawl reengagement to a lower rotational speed, thereby increasing clutch hysteresis.

It is a more specific object of the present invention to provide a pawl and ratchet clutch having a plurality of pivotal pawls, each pawl having weight means operatively associated therewith for shifting the center of gravity the pawls by changing position in response to the rotational speed of the pawl carrier.

The pawl and ratchet clutch assembly of the present invention includes ratchet means mounted to a drive member, a plurality of pivotal pawls disposed circumferentially about the ratchet means, each pawl being mounted about a pivot pin for pivotal movement into and out of engagement with the ratchet means, the pawls and ratchet means when engaged being operative to transmit rotational drive torque from the driving member to a driven member on which the pawls are carried, preload means for biasing the pawls to pivot radially inwardly into engagement with the ratchet means, and weight means operatively associated with each pawl for shifting the center of gravity thereof by changing position in response to the rotational speed of the member on which the pawls are carried.

In accordance with the present invention, each pawl has a toe end, a heel end, a central body portion extending therebetween on which there is provided an elongated track means extending generally circumferentially from the toe end to the heel end thereof, and weight means slidably disposed with the track means for translation therealong. When the toe ends of the pawls are engaged with the ratchet means, the weight means is displaced to the heel end of the track means by the centrifugal forces acting on the pawls. As a result of the repositioning of this weight means, the center of gravity of each pawl shifts closer to its pivot axis, thereby raising the rotational speed at the pawls will lift-off the ratchet means. After disengagement, the pawls pivot radially outwardly so as to lift-off the ratchet member and the weight means translates along the track means to the toe end thereof. As a result, the center of gravity of each pawls again shifts, but now moves farther from its pivot axis, thereby reducing the rotational speed necessary to maintain the pawls in disengagement.

BRIEF DESCRIPTION OF THE DRAWINGS

The aforementioned and other objects, features and advantages of the present invention will become more apparent in light of the following detailed description of the invention and the embodiment thereof illustrated in the accompanying drawing, wherein.

BEST MODE FOR CARRYING OUT THE INVENTION

Figure 1:
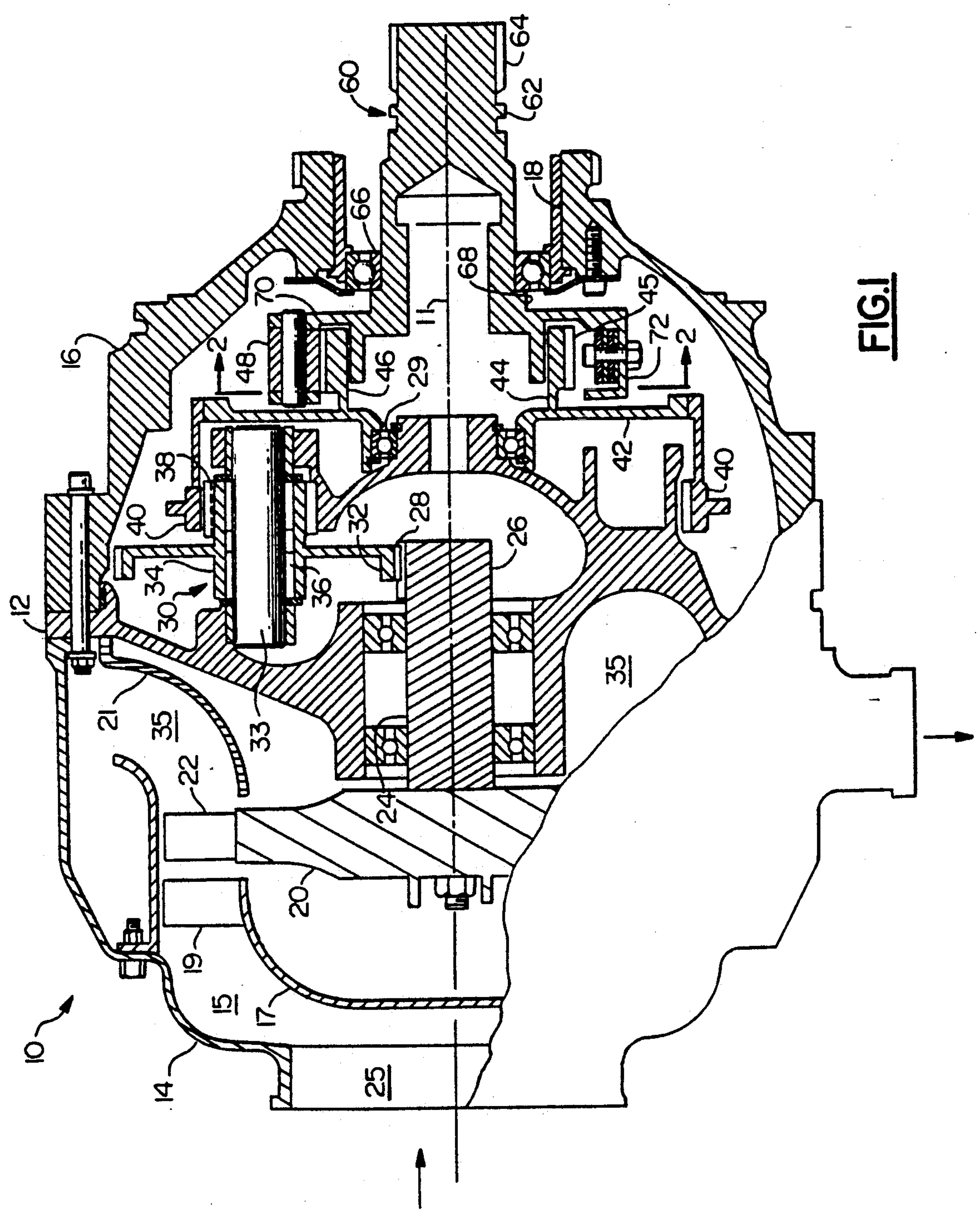
FIG. 1 is a partially-sectioned side elevational view of a pneumatic starter having a pawl and ratchet assembly incorporating pawls having shifting weight means associated therewith for positioning the center of gravity of the pawl.

Referring now to FIG. 1, there is depicted therein a pneumatic starter 10 of the general type often utilized to start gas turbine engines, such as for example aircraft turbine engines. The pneumatic starter 10, also known as an air turbine starter, includes a turbine wheel 20 which is driven by a compressed gas, most commonly compressed air from an external supply, passing therethrough so as to extract energy from the gas and convert the extracted energy to mechanical energy in a manner well known in the art. Although the present invention is described herein with reference to an air turbine starter, it is to be understood that the pawl and ratchet assembly of the present invention has application on any unidirectional drive system wherein a pawl and ratchet clutch is utilized to transmit rotation from a driving shaft to a driven shaft.

The pneumatic starter 10 has a gear housing 12 disposed between and mounted to an inlet housing 14 and a transmission housing 16. The inlet section 14 defines a flow chamber 15 having an axial flow inlet 25 and an annular flow outlet 35. Disposed within the flow chamber 15 intermediate therebetween is turbine wheel 20 having a plurality of blades 22 disposed about its outer circumference and a central axially extending shaft 24. The turbine wheel 20 is mounted to its shaft 24 such that the shaft 24 is driven in rotation about its axis as the turbine wheel 20 is caused to rotate by the compressed air supplied from an external source thereof to the flow inlet 25 and passing through the turbine blades 22 to the flow outlet 35. A turbine shield 17, having a plurality of stator vanes 19 disposed circumferentially thereabout, may be disposed within the flow chamber 15 forward of the turbine wheel 20 to ensure that the incoming compressed air is properly directed through the turbine blades 22 in a desired manner. A flow deflector 21 may be disposed downstream of the turbine wheel 20 to direct the exhaust air from the turbine blades 22 to the flow outlet 35.

The energy extracted from the compressed air via the turbine wheel 20 is transmitted through the turbine shaft 24 to drive one or more transmission gear assemblies 30, for example three transmission gear assemblies disposed at equal circumferentially spaced intervals about the end 26 of the turbine shaft 24. Each gear assembly 30 comprises a drive gear 32 on one end of a central support shaft 34 rotatably supported via bearing means 36, for example roller bearings, on a stationary shaft 33, and a pinion gear 38 also provided on the support shaft 34 on the other end thereof. Advantageously, the drive gear 32, the pinion gear 38 and support shaft 34 may be formed as a single integral member. The drive gear 32 of each gear assembly 30 is operatively connected via intermeshing teeth members to a sun gear 28 provided on end 26 of the turbine shaft 24 and the pinion gear 38 of each gear assembly 30 is operatively connected via intermeshing teeth members to a ring gear 40.

The ring gear 40 is carried on and extends axially inwardly from the outer circumference of a radially extending central support member 42 which is rotatably supported on bearings 29 carried on a central strut of the starter housing 12. Also carried by the central support member 42 is a cylindrical flange member 44 which extends coaxially outwardly therefrom about the axis 11. The cylindrical flange member 44 has a plurality of rake teeth 45 formed on its outer circumference so as to form a ratchet member 46 which in cooperation with pawls 48 forms a pawl and ratchet clutch assembly 50.

Figure 2:
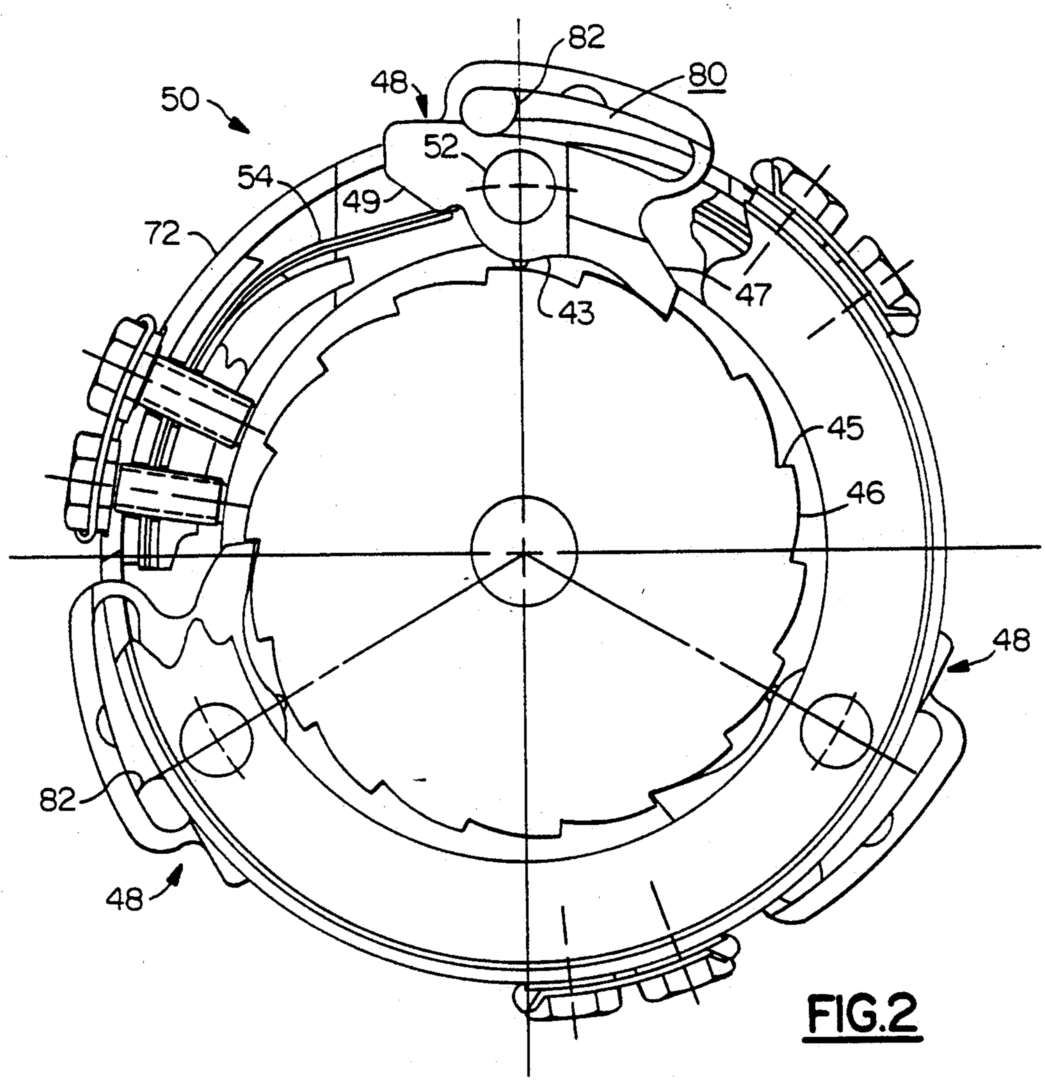
FIG. 2 is a sectional side elevational view of the pawl and ratchet assembly of the present invention taken along line 2—2 of FIG. 1 showing the pawls engaged with the ratchet member.
Figure 4:
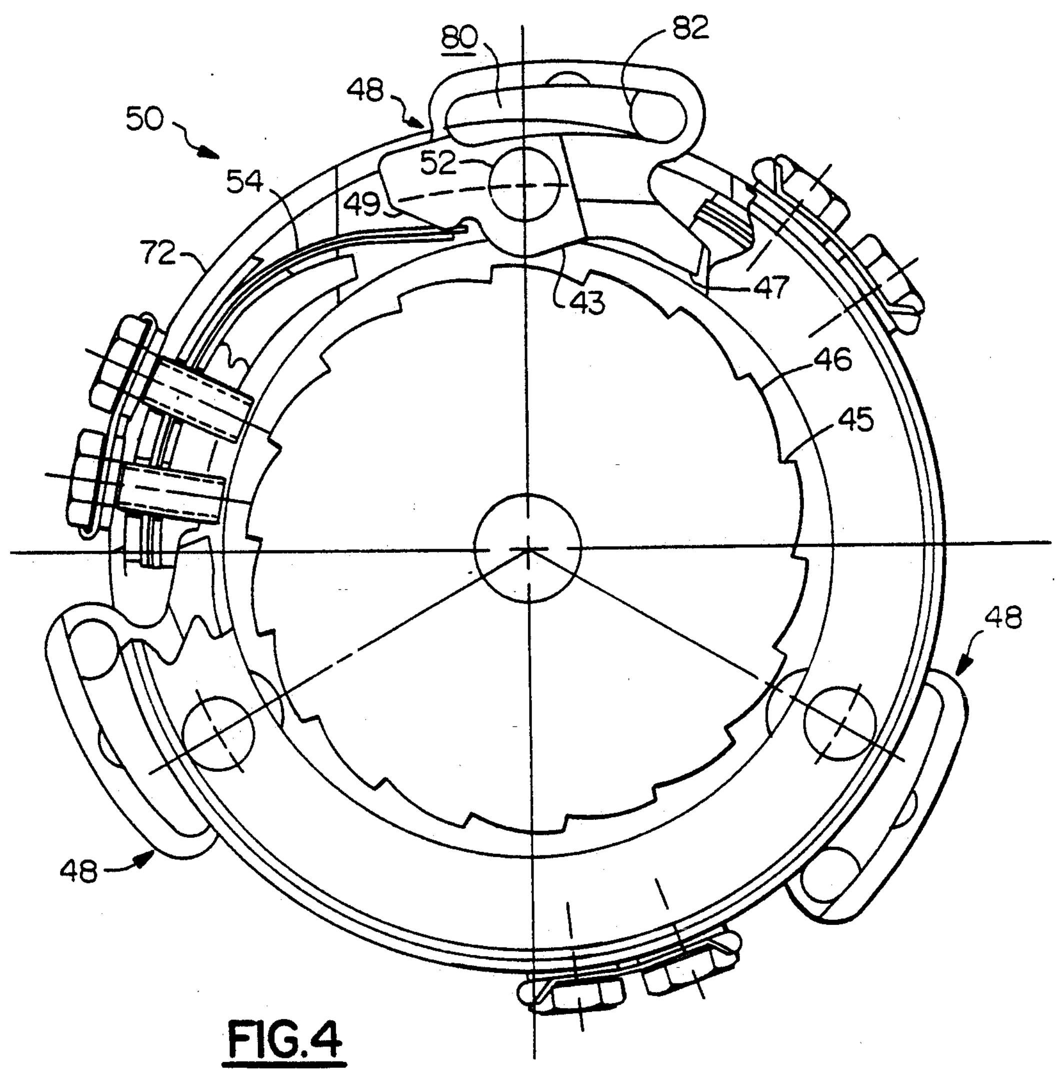
FIG. 4 is a sectional side elevational view of the pawl and ratchet assembly of the present invention taken along line 2—2 of FIG. 1 showing the pawls disengaged from the ratchet member and repositioned.

Extending axially outwardly through a central opening 18 in the transmission housing section 16 of the starter 10 and coaxially along the axis 11 thereof, is an output shaft 60 which has a distal end 62 provided with means, such as for example splines 64, for engaging an engine shaft (not shown) in the gear box of the turbine engine (not shown) on which the starter 10 is utilized to start the turbine engine. The output shaft 60 is rotatably supported on bearing means 66 disposed in the central opening 18 and carried on housing section 16. The aforementioned pawls 48, of which there are typically three, are supported on a clutch carrier 70 which extends radially outward from the output shaft 60 at the proximal end 68 thereof. As best illustrated in FIGS. 2 and 4, each of the pawls 48 is pivotally supported on a shaft 52 mounted to and extending axially from the support flange 70 such that the pawls are disposed in cooperation with the ratchet member 46 at equally spaced intervals about the circumference of and in radially spaced relationship from the ratchet member 46.

Additionally, each of the pawls 48 is biased to pivot about its support shaft 52 to rotate the toe end 47 thereof radially inwardly towards the ratchet member 46 under the force of a preload means 54 mounted to an axial flange portion 72 of the clutch carrier 70. Each preload means 54 may comprise a bias spring, for example a leaf spring, operatively bearing against the heel end 49 of its associated pawl so as to, in a manner well known in the art, function during operation of the starter 10 to load the toe end 47 of its associated pawl 48 into engagement with the teeth of the ratchet member 46 of the pawl and ratchet clutch to ensure transmission of torque from the ring gear 40 to the output shaft 60 until the output shaft 60 has reached a relatively high desired cut-off speed, for example about 5000 rpm, at which the pawls 48 pivot away from the ratchet member 46 under the influence of centrifugal force after disengagement from the teeth 45 of the ratchet member 46 upon slowing down of the ratchet member 46 after termination of the flow of compressed air through the starter turbine 20. It is to be understood, however, that the preload means is not limited to leaf springs bearing upon the heel portion of the pawl, but may comprise any means suitably configured and disposed for biasing the toe portion of the pawl 48 radially inwardly toward the ratchet member 46.

When the pawls 48 are engaged with the teeth of the ratchet 46 during operation of the starter 10, the output shaft 60 of the starter, and the engine shaft of the turbine engine connected therewith, are driven in rotation by the ring gear 40 through the engaged pawl and ratchet clutch. The ring gear 40 is driven in rotation about axis 11 by the energy extracted from the compressed air passing through the blades 22 of the turbine wheel 20 via transmission of the rotational torque imparted to the shaft 24 of the turbine wheel 20 through the sun gear 28 to the drive gears 30 and therefrom through the pinion gears 38 to the ring gear 40.

After the shaft of the turbine engine engaged with the output shaft 60 of the starter 10 has reached the preselected desired engine speed, the flow of compressed air to and through the turbine wheel 20 is shut off. As a result, drive power is no longer being delivered to the ratchet member 46 through the drive gears 30 and ring gear 40. Consequently, the ratchet member 46 slows down and its rotational speed rapidly decreases, while the output shaft 60 of the starter 10 and the pawls 48 mounted thereto continue to rotate at the higher engine speed, thereby causing the pawls 48 to become disengaged from the ratchet member 46 and pivot away from the ratchet member 46 as hereinbefore discussed.

When the turbine engine is later shut down, the starter output shaft 60 begins to slow down and its rotational speed steadily decreases as the turbine engine spools down. As the output shaft 60 coasts down, the centrifugal force acting on the pawls 48 so as to urge the toe ends 47 of the pawls 48 radially outwardly steadily decreases and the toe end 47 of each pawl 48 begins to pivot radially inwardly toward the ratchet member 46 under the preload force applied by the springs 54 on the heel ends 49 of the pawls 48 until the toe ends 47 of the pawls 48 re-engage with the teeth of the ratchet member 46.

In the pawl and ratchet clutch assembly 50 of the present invention, each of the pawls 48 has a central body portion 43 extending between a toe end portion 47 and a heel end portion 49 thereof, and mounted on a pivot pin 52 for pivotal movement thereabout whereby the toe end 47 thereof may move radially inwardly into engagement with the ratchet member 46 and radially outwardly out of engagement from the ratchet member 46. In accordance with the present invention, the body portion 43 of each pawl 48 is provided with an elongated track means 80, for example a slot, which defines a travel path extending generally circumferentially along the body portion 43 of the pawl 48 between its toe end 47 and its heel end 49, and weight means 82 disposed within each track means 80 for shifting the center of gravity 93 of the pawl 48 relative to its pivot axis 55 in response to the rotational speed of the output shaft 60 on which the pawl carrier 70 is mounted for rotation therewith. Each weight means 82, which advantageously may comprise a ball as illustrated in the depicted embodiment, is slidably disposed to translate along the travel path defined by track 80 back and forth between the toe end 87 and the heel end 89 thereof under the influence of centrifugal forces acting upon the pawls 48 as the pawl carrier 70 rotates with the output shaft 60.

As the weight ball 82 translates along the travel path defined by the track 80, the center of gravity 93 of the pawl 48 shifts from its neutral position in direction of movement of the weight ball 82. The neutral position of the center of gravity of the pawl 48 is the position whereat the pawl center of gravity is located when the weight ball 82 is disposed at the mid-point of its travel length along the track 80 Thus, when the weight ball 82 is disposed in the toe end 87 of the track 80, the center of gravity 93 of the pawl 48 is shifted away from its neutral position towards the toe end 47 of the pawl 48. Conversely, when the weight ball 82 is disposed in the heel end 89 of the track 80, the center of gravity 93 of the pawl 48 is shifted away from its neutral position towards the heel end 49 of the pawl 48.

Figure 3:
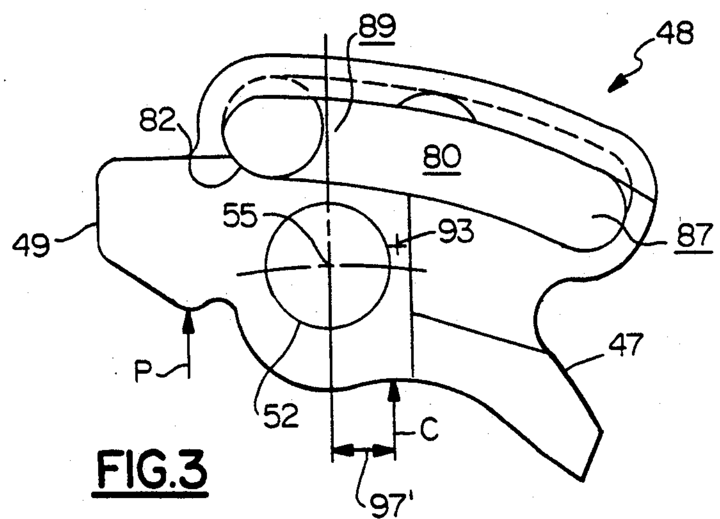
FIG. 3 is a force and moment diagram of a pawl of the pawl and ratchet assembly of FIG. 2.

Referring now to FIGS. 2 and 3 wherein the toe end 47 of each of the pawls 48 is engaged with the teeth 45 of the ratchet member 46 so as to transmit drive torque from the ring gear 40 to the output shaft 60, the weight ball 82 is positioned under the influence of centrifugal force in the heel end 89 of the of the track means 80, since the heel end 89 constitutes the radially outermost portion of the track means 80 when the toe end 47 of the pawl 48 is engaged with the ratchet means 46. With the ball 82 so positioned, the center of gravity 93 of the pawl is positioned relatively closer to the pawl pivot axis 55 extending through its pivot pin 52. Therefore, the centrifugal moment created by the centrifugal force C acting on the pawl 48 through the relatively shorter arm 97' between the pawl's pivot axis 55 and its center of gravity 93 will not be sufficient to overcome the opposing preloading moment created by the preloading force P imposed upon the heel of the pawl 48 by the bias spring 54, and thereby lift the pawls 48 off the ratchet member 46, until the pawl carrier 70 is rotating at a relatively higher speed at which the increased centrifugal force due to the higher rotational speed compensates for the shorter moment arm 97'.

Figure 5:
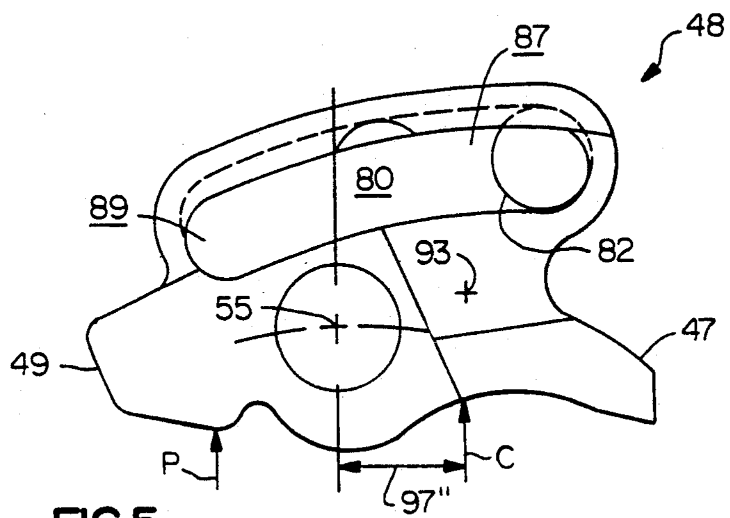
FIG. 5 is a force and moment diagram of a pawl of the pawl and ratchet assembly of FIG. 4.

Once the pawls have been disengaged from the ratchet member 46 and pivot radially outwardly about their respective pivot pins 52 as illustrated in FIGS. 4 and 5, the ball 82 is repositioned under the influence of centrifugal force to the toe end 87 of the of the track means 80, since the toe end 87 constitutes the radially outermost portion of the track means 80 when the toe end 47 of the pawl 48 is disengaged from and lifted-off the ratchet means 46. With the ball 82 so positioned, the center of gravity 93 of the pawl is positioned relatively farther from to the pawl pivot axis 55 extending through its pivot pin 52. Therefore, the centrifugal moment created by the centrifugal force C acting on the pawl 48 through the relatively longer arm 97'' between the pawl's pivot axis 55 and its center of gravity 93 will be sufficient to overcome the opposing preloading moment created by the preloading force P imposed upon the heel of the pawl 48 by the bias spring 54, and thereby hold the pawls 48 off the ratchet member 46 and delay radially inward pivoting of the pawls 48 into reengagement, until the pawl carrier 70 is rotating at a relatively lower speed at which the preloading moment overcomes the opposing moment of the decreased centrifugal force C at the lower rotational speed even though operating through the longer moment arm 97''.

Although the invention has been shown and described with respect to a best mode embodiment exemplary thereof, it should be understood by those skilled in the art that various modifications, changes, omissions and additions in the form and detail thereof may be made without departing from the spirit and scope of the invention.

We claim:

1. A pawl and ratchet clutch assembly for use in transmitting rotational drive torque from a driving member to a driven member when said pawl and ratchet clutch assembly is engaged, said driven member being free to rotate at a speed independent of a speed at which said drive member is rotating when said pawl and ratchet clutch assembly is disengaged, said pawl and ratchet clutch assembly comprising ratchet means mounted to the drive member, a plurality of pawls mounted to a support member connected to the driven member and disposed circumferentially about said ratchet means and operable in engagement therewith to transmit the rotational drive torque from the driving member to the driven member, each of said pawls having a body portion and a toe portion, the body portion being supported on a pivot pin for pivotal movement about a pivot axis to bring the toe portion into and out of engagement with said ratchet means, preload means for biasing said pawls to pivot radially inwardly into engagement with said ratchet means, track means provided in the body portion of each of said pawls for defining a travel path extending along said pawl, and weight means slidably disposed within each of said track means for translating along said travel path so as to shift the center of gravity of said pawl relative to the pivot axis, said weight means being positionable within said track means under the influence of centrifugal force in response to the speed of said driven member when said pawl and ratchet clutch assembly is disengaged.

2. A pawl and ratchet clutch assembly as recited in claim 1 wherein said track means comprises a generally circumferential slot extending between a toe end of said pawl disposed at one end of a central body portion of said pawl and a heel end of said pawl disposed at the other end of the central body portion of said pawl, the central body portion of said pawl mounted to said pivot pin, and said weight means comprises a ball disposed within said slot for rolling movement along the travel path defined by said slot in response to the rotational speed of the pawl support member.

* * * * *